United States Patent [19]

Koizumi et al.

[11] Patent Number: 5,204,796
[45] Date of Patent: Apr. 20, 1993

[54] TAPE CASSETTE WITH TAPE TENSION CONTROLLED BY GREASE OF A SPECIFIED RANGE OF VISCOSITY

[75] Inventors: Osamu Koizumi; Kengo Saito; Kazuo Sasaki; Masayuki Itabashi, all of Miyagi, Japan

[73] Assignee: Sony Corporation, Tokyo, Japan

[21] Appl. No.: 639,225

[22] Filed: Feb. 15, 1991

Related U.S. Application Data

[62] Division of Ser. No. 448,622, Dec. 11, 1989, abandoned.

[30] Foreign Application Priority Data

| Dec. 12, 1988 | [JP] | Japan | 63-313485 |
| Dec. 15, 1988 | [JP] | Japan | 63-317355 |
| Jan. 9, 1989 | [JP] | Japan | 1-929 |
| Jan. 9, 1989 | [JP] | Japan | 1-930 |

[51] Int. Cl.$^5$ ............................................. G11B 23/02
[52] U.S. Cl. ................................................ 360/132; 242/199
[58] Field of Search .......................... 360/132; 242/199

[56] References Cited

U.S. PATENT DOCUMENTS

| 2,147,343 | 2/1939 | Hokanson . |
| 3,388,455 | 6/1968 | Wieland . |
| 4,063,980 | 12/1977 | Trunnell . |
| 4,102,516 | 7/1978 | Anglin et al. . |
| 4,198,013 | 4/1980 | Anglin et al. . |
| 4,231,532 | 11/1980 | Popov et al. . |
| 4,457,473 | 7/1984 | Mroz . |

FOREIGN PATENT DOCUMENTS

| 166613 | 2/1986 | European Pat. Off. . |
| 0184139 | 7/1987 | European Pat. Off. . |
| 285944 | 12/1988 | European Pat. Off. . |
| 2532360 | 3/1984 | France . |
| 59-87674 | 5/1984 | Japan . |

Primary Examiner—A. J. Heinz
Attorney, Agent, or Firm—Hill, Steadman & Simpson

[57] ABSTRACT

A tape cassette comprises a supply and a take-up reel on which tape is wound, a cassette casing for rotatably enclosing the reels therein, a plurality of tape guide pins, each being press-fitted through the inner wall of the casing, for defining a tape path for the tape travelling between the pair of reels. The press-fit section of each guide pin is formed in a predetermined taper in such a manner as to gradually decrease its outer diameter towards its end. The straight press-fit section of the guide pin is formed in such a manner as to include a predetermined geometry of chamfered circumference at its end. In a tape guide pin used in conjunction with a tape guide roller, grease having a predetermined viscosity coefficient is disposed between the associated pin and roller. An electrical insulating cover is provided for surrounding the exposed underside of the electrically conductive lower half of the casing.

6 Claims, 7 Drawing Sheets

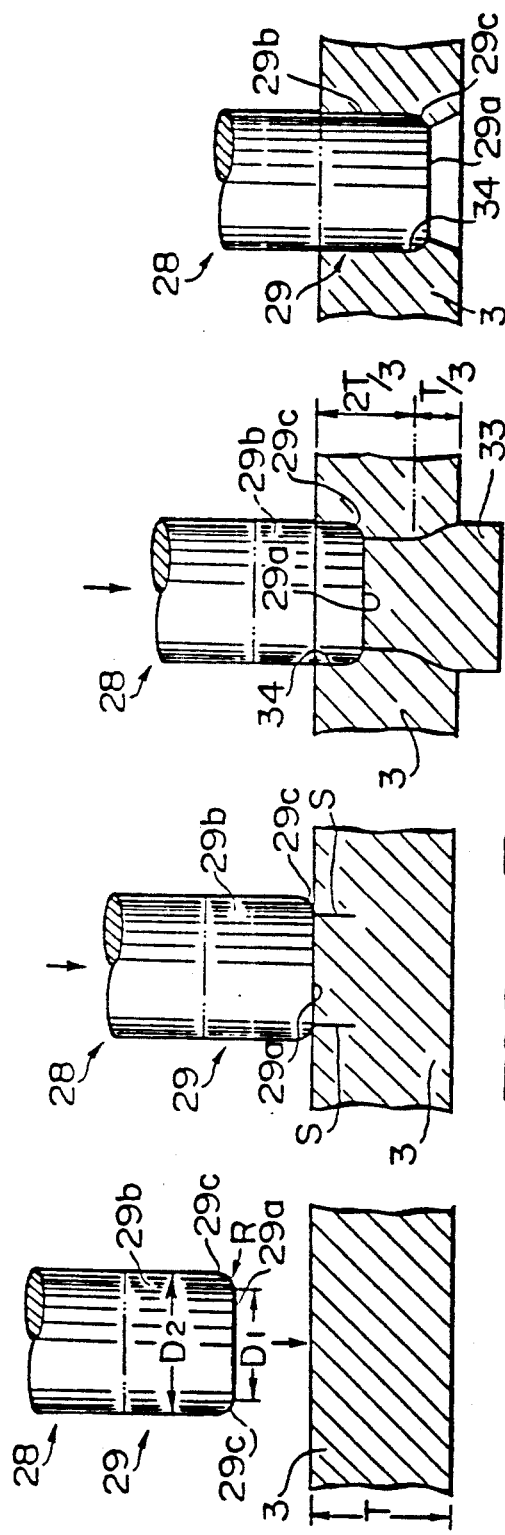
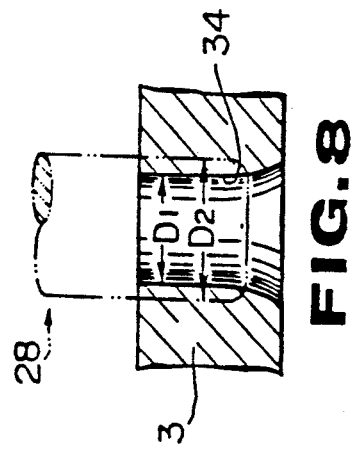

TAPE CASSETTE WITH TAPE TENSION CONTROLLED BY GREASE OF A SPECIFIED RANGE OF VISCOSITY

This is a division, of application Ser. No. 448,622, filed Dec. 11, 1989 abandoned.

BACKGROUND OF THE INVENTION

1. Field of the Invention

The present invention relates to a tape cassette which is optimally adapted for use in recording and/or reproducing apparatus. Specifically to a tape cassette wherein tape guide pins are press-fitted onto a cassette casing.

2. Description of the Prior Disclosure

Recently, there have been proposed and developed various magnetic tape cassettes to serve as an external data storage medium.

One such magnetic tape cassette has been disclosed in U.S. Pat. No. 4,198,013. This conventional tape cassette includes a pair of reels, namely a supply reel and a take-up reel, rotatably supported in the cassette casing. As is generally known, magnetic tape is wound on the pair of reels through a plurality of tape guide pins by which the travelling path of the tape is controlled in such a manner that the tape is wound on the reels at a predetermined contact angle. That is, the tape travelling path is defined by the upstanding guide pins, each arranged at a predetermined location on the cassette casing. As shown in FIG. 1, a conventional guide pin 90 is integrally formed with a tape contact section 90a, upper and lower flange sections 90b, and a press-fit section 90c extending from the bottom surface of the lower flange section. Each section 90a, 90b, or 90c has a specific, constant outer diameter. As seen in FIG. 1, the guide pin 90 is fixed on the cassette casing such that the press-fit section 90c is press-fitted onto the aluminum alloy lower half of the casing. Such guide pins are traditionally formed by lathe machining. The machining accuracy may be affected by various machining conditions, such as deflection of the workpiece, fluctuation in bite by a cutting tool, and fluctuation in lubrication by a cutting lubricant. For example, as shown in FIG. 2, the press-fit section 90c is often formed in a reverse taper fashion in which the outer diameter is gradually increased from its root connected to the bottom surface of the lower flange section 90b to its end. Therefore, the outer diameter a at the root is slightly smaller than that b at the end. If such a reverse tapered press-fit section of the guide pin is press-fitted into the lower half of the casing, the greatest outer diameter of end of the press-fit section 90c expands a preformed hole and forms a hole 33 slightly greater than a required outer diameter of hole, over the whole length of press-fit section 90c. As a result, after pressing, pressure occurring between the outer periphery of the press-fit section 90c and the inner periphery of the hole formed in the lower half of the cassette casing is decreased. Under these conditions, since the guide pin 90 is not press-fitted tightly enough into the lower half, the guide pin 90 may be easily removed from the lower half. Therefore, there is a possibility that the guide pins may dislodge due to external forces, such as vibration.

During press-fitting of a guide pin, a maximum impact with regard to the lower half occurs at the beginning of pressing. Specifically, since the end of the reverse tapered press-fit section 90c has a maximum outer diameter, the initial impact during pressing becomes excessively high, thereby resulting in deformation or damage to the lower half. Therefore, the flatness of the lower half may be compromised and as a result tape travel may become unstable. The above mentioned defect of a reverse-tapered press-fit section for a guide pin may also occur to some degree in a non-tapered, or straight press-fit section for a guide pin. If a reverse-tapered or straight press-fit section is press-fitted onto the lower half of a cassette without any preformed hole, the flatness of the lower half may be comprimised to a greater degree, due to the excessively high, initial impact necessary during pressing and in addition such guide pins may also be dislodged relatively easily by external forces. Traditionally, such a guide pin is used in the lower half of a casing in such a manner as to directly guide magnetic tape on its cylindrical outer peripheral surface or to guide magnetic tape via a guide roller rotatably assembled therearound. In general, since the surfaces of such conventional guide pins are finished within a range of a maximum surface-roughness Rmax 0.5 to 0.8 μm, there is a possibility that dust may be generated at the point of contact between the guide pins and the coated tape surface, resulting in so-called dropout error if the tape cassette is used for a relatively long time. In a guide pin employing the guide roller, since magnetic tape is guided by the outer peripheral surface of the guide roller, generation of the previously described dust is reduced. Such guide rollers may provide extremely smooth tape feed, however this makes tape tension control quite difficult.

Furthermore, in tape cassettes including such press-fitted guide pins, the lower half, receiving the guide pins, is made of electrically conductive material, such as aluminum alloy, as previously described. Therefore, were an user, charged with static electricity to touch the lower half of the casing of the tape cassette while loading the recording and/or reproducing apparatus for operation, static electricity may be discharged through the lower half of the cassette, through the cassette holder of the apparatus into the electrical control unit including logical circuits, resulting in error of logical circuits because of their low degree of tolerance to static electricity.

SUMMARY OF THE INVENTION

It is, therefore in view of the above disadvantages, an object of the present invention to provide a tape cassette in which a tape guide pin is firmly press-fitted into a cassette casing.

It is another object of the invention to provide a tape cassette which is capable of maintaining a high degree of flatness in the casing even after guide pins have been press-fitted to the casing.

It is a further object of the invention to provide a tape cassette which can provide optimal tape tension during tape travel.

It is another object of the invention to provide a tape cassette which is capable of preventing static electricity from a user from being introduced through the cassette casing to electric or electronic elements in the associated recording and/or reproducing apparatus.

It is a still further object of the invention to provide a tape cassette which has high durability and high reliability to maintain high quality as a recording medium.

In order to accomplish the aforementioned and other objects, a tape cassette comprises a pair of reels mounted side by side, on which tape is wound, a cassette casing for rotatably enclosing the pair of reels therein, at least one tape guide pin being press-fitted through the wall of the casing, for defining a tape path for tape travel between the pair of reels. The guide pin include a press-fit section press-fitted into the casing. The press-fit section is formed in a taper fashion in such a manner as to gradually decrease its outer diameter towards the end of the press-fit section. Preferably, the press-fit section may be frusto-conical, and its taper may be within a range of 1/250 to 1/38 to insure optimum press-fit with the casing.

According to another aspect of the invention, a tape cassette comprises a pair of reels mounted side by side, on which tape is wound, a cassette casing for rotatably enclosing the pair of reels therein, an upstanding pin being press-fitted through the wall of the casing. The pin includes a cylindrical press-fit section to be press-fitted into the casing without need of a preformed hole. The press-fit section includes a cylindrical outer peripheral surface coaxial to the axis of the pin, a chamfered annular circumference at the lower tip of the cylindrical surface, terminating in a flat circular end perpendicular to the axis and having an outer diameter less than that of the cylindrical surface. The chamfered annular circumference is formed with a curved surface, the curve, in cross-section, corresponding to the perimeter of a circle with a radius in a range of 0.2 to 0.3 mm, or with a 45° sloped, frusto-conical surface essentially corresponding to the dimension of the curved surface.

The tape guide pin or upstanding pin may be formed of non-magnetic stainless steel material by lathe machining. When the tapered or chamfered pin is used in a manner so as to contact with a tape surface having magnetic substance, its contacting surface has a maximum surface roughness of Rmax 0.1 to 0.4 μm to provide smooth tape travel. The contacting surface is finished by super-finishing after centerless grinding so as to accomplish a maximum surface-roughness of Rmax 0.1 to 0.4 μm.

The casing is comprised of an upper half formed of electrical insulating material and a lower half formed of electrically conductive metal material suitable for the press-fitting of the tape guide pin or the upstanding pin. When a portion of the conductive lower half is exposed outside of a recording and/or reproducing apparatus in a state wherein the tape cassette is set to a predetermined loaded position, the casing may preferably include an insulating member for electrically insulating the conductive half, for preventing static electricity from being introduced through an exposed portion of the conductive half into the apparatus. The insulating member comprises the outer wall of the casing surrounding the outer perimeter of the conductive half. The insulating member overlaps the exposed underside of the conductive half by substantially 20 mm.

According to a further aspect of the invention, a tape cassette comprises a pair of reels mounted side by side, on which tape is wound, a cassette casing for rotatably enclosing the pair of reels therein, a driven roller being rotated by a drive device of a recording and/or reproducing apparatus, associated with the tape cassette, the driven roller rotatably supported by an upstanding roller shaft fixed on the wall of the casing, a pair of idle rollers, each rotatably supported by an upstanding roller shaft fixed on the wall of the casing, an endless flexible drive belt for drivingly engaging the driven roller and the idle rollers to rotate the reels, such that a portion of the drive belt between the driven roller and each idle roller pressingly contacts a portion of the outermost peripheral surface of the tape wound on each reel, the drive belt being driven according to rotation of the driven roller, and means for controlling tape tension of the tape during operation of the tape cassette, the means including grease disposed between the associated rollers and shafts for lubricating the contacting surfaces therebetween, with a predetermined viscous drag. The grease includes a viscosity coefficient of 50 to 500 P (poise) within a grease temperature range of −10° to 60° C. Each of the roller shafts may be press-fitted through the wall of the casing. The roller shaft includes a press-fit section formed in taper fashion such as to gradually decrease its outer diameter towards its end. Preferably, the press-fit section is frusto-conical, and its taper is within a range of 1/250 to 1/38. The roller shaft may also include a cylindrical press-fit section press-fitted into the casing without a preformed hole. The press-fit section includes a cylindrical outer peripheral surface coaxial to the axis of the pin, a chamfered annular circumference at the lower tip of the cylindrical surface, terminating in a flat circular end perpendicular to the axis and having an outer diameter less than that of the cylindrical surface. The chamfered annular circumference is formed with a curved surface, the curve, in cross-section, corresponding to the perimeter of a circle with a radius in a range of 0.2 to 0.3 mm, or with a 45° sloped, frusto-conical surface essentially corresponding to the dimension of the curved surface.

According to a still further aspect of the invention, a tape cassette comprises a pair of reels mounted side by side, on which tape is wound, a cassette casing for rotatably enclosing the pair of reels therein, the casing partially including an electrically conductive section constructed such that a portion of the conductive section is exposed outside of a recording and/or reproducing apparatus in a state wherein the tape cassette is set to a predetermined loaded position, an insulating member for electrically insulating the conductive section, for preventing static electricity from being introduced through an exposed portion of the conductive section into the apparatus. The insulating member comprises the outer wall of the casing surrounding the outer perimeter of the conductive section. The casing is comprised of a pair of halves. The insulating member overlaps the exposed underside of the conductive section by substantially 20 mm.

BRIEF DESCRIPTION OF THE DRAWINGS

FIGS. 7A to 7D are partial cross sectional views illustrating a pressing process for a straight press-fit section of the guide pin according to the invention including a predetermined geometry of chamfered circumference at the base of the pin.

FIG. 8 is a partial cross sectional view illustrating the cross-sectional configuration of the hole punched by the straight press-fit section of the guide pin according to the invention.

DESCRIPTION OF THE PREFERRED EMBODIMENT

The principles of the present invention, applied to a tape cassette for recording and/or reproducing apparatus, are illustrated in FIGS. 3A to 13.

Figure 5:
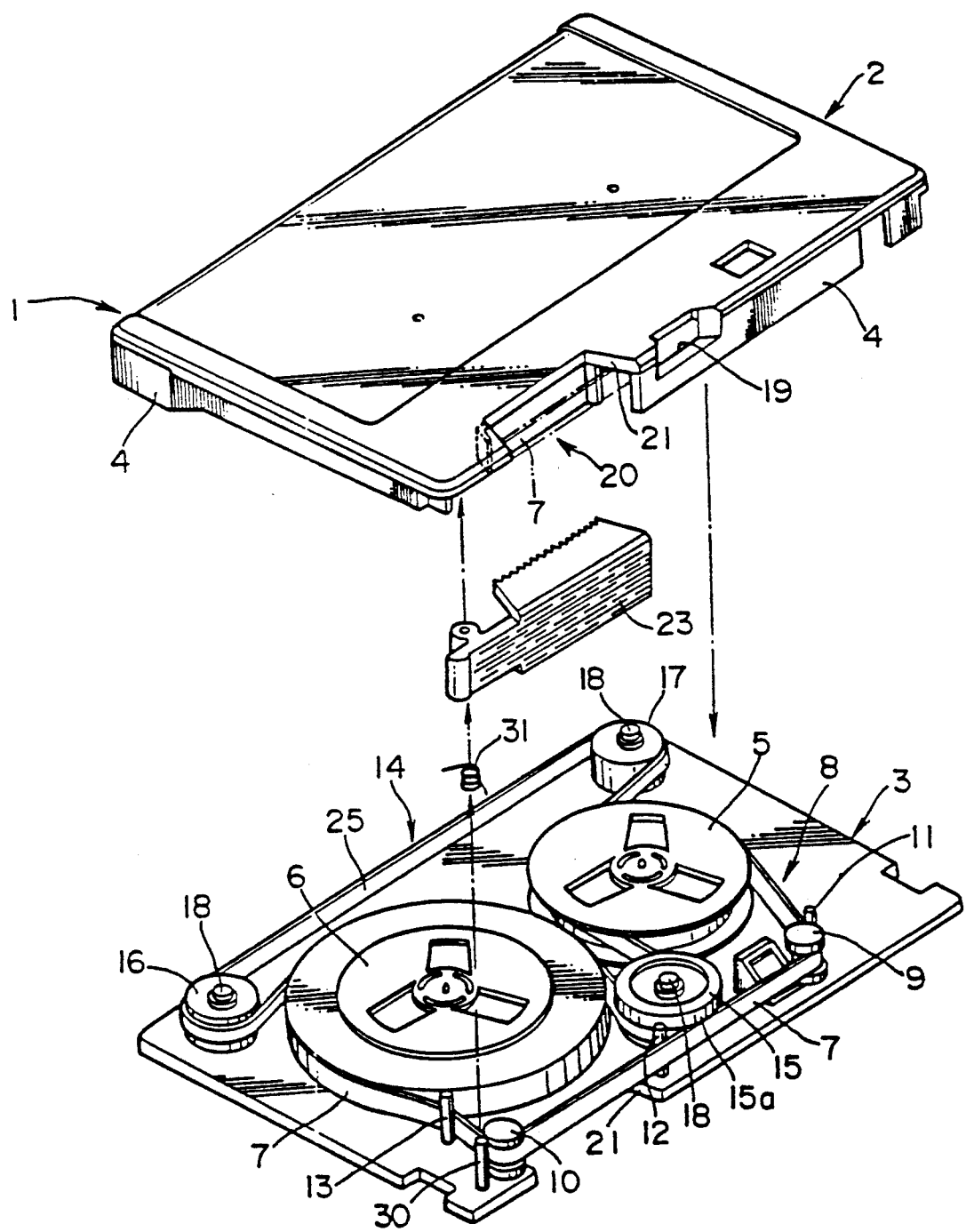
FIG. 5 is an exploded perspective view illustrating a tape cassette according to the invention.
Figure 6:
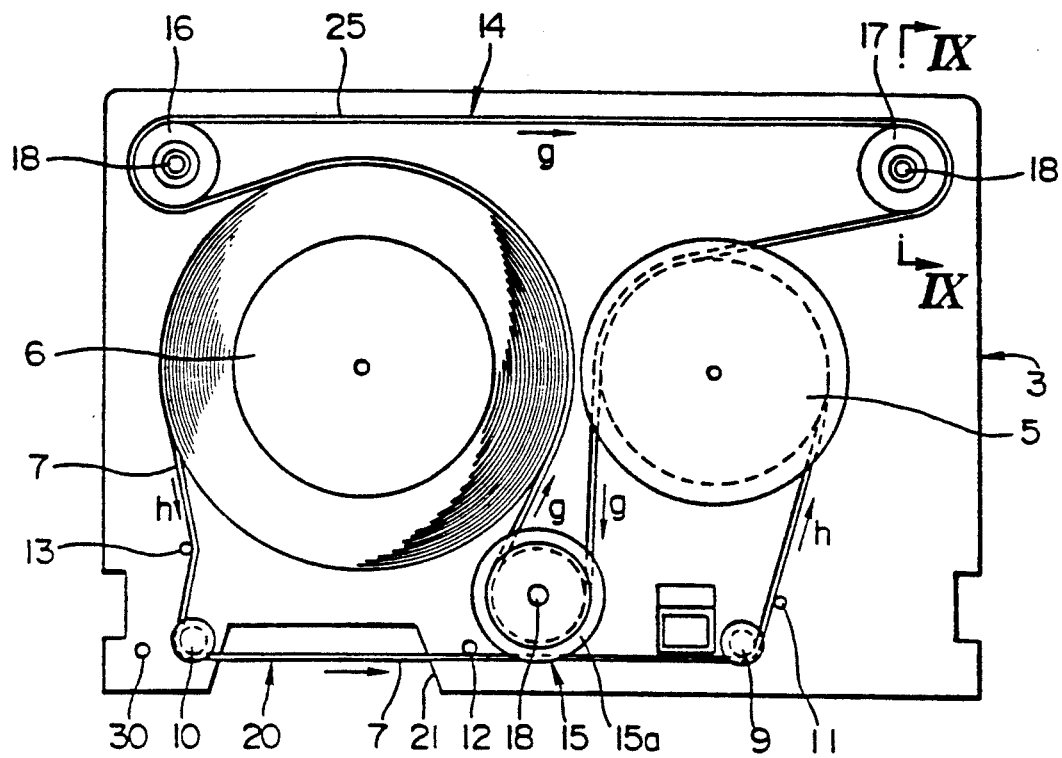
FIG. 6 is a plan view illustrating a tape cassette according to the invention under a condition wherein the upper half has been removed.

Referring now to FIGS. 5 and 6, a tape cassette according to the invention includes an upper half 2 formed of electrical insulating synthetic resin and a flat, lower half 3 formed of aluminum alloy together forming a cassette casing 1. The upper half 2 is comprised of a substantially flat, upper wall and a side wall 4 extending downward from the outer perimeter of the upper wall. The casing 1 defines an internal space for rotatably supporting a pair of reels, one being a supply reel 5 and the other a take-up reel 6, in such a manner that the edge of side wall 4 abuts the outer perimeter of the lower half 3. Magnetic tape 7 is wound on the pair of reels 5 and 6 through a plurality of upstanding tape guide pins which are firmly disposed on the lower half 3. The path of tape travel is defined by the guide pins, each arranged at a predetermined location on the lower half 3 of the casing 1. As best seen in FIG. 6, two flanged guide pins 9 and 10, are located near the front face of the casing 1, and straight guide pins 11, 12, and 13, are respectively located between the supply reel 5 and the guide pin 9, between the two guide pins 9 and 10, and between the guide pin 10 and the take-up reel 6. Tape from the supply reel 5 is drawn over the guide pin 9 at a predetermined contact angle, thus changing the direction of tape travel. Thereafter, the tape travels parallel to and in the vicinity of the front face of the casing 1. Subsequently, the tape is drawn over the guide pin 10 at a predetermined contact angle and again the tape travelling direction is changed to facilitate the tape being wound finally on the take-up reel 6.

Figure 1:
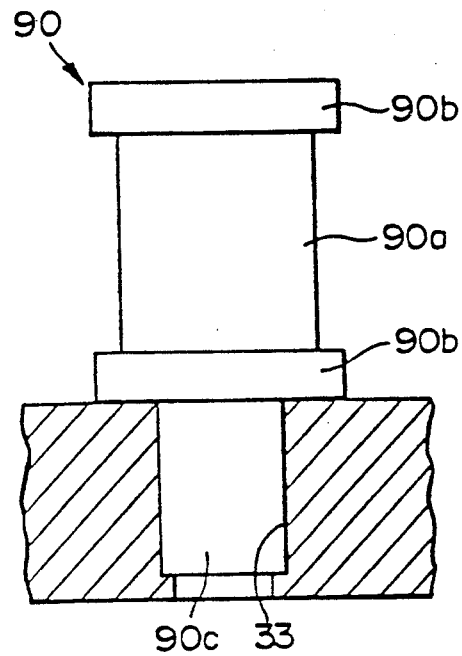
FIG. 1 is a cross sectional view illustrating a tape guide pin used for conventional magnetic tape cassettes at a state wherein the tape guide pin is press-fitted into the lower half of the cassette casing.
Figure 2:
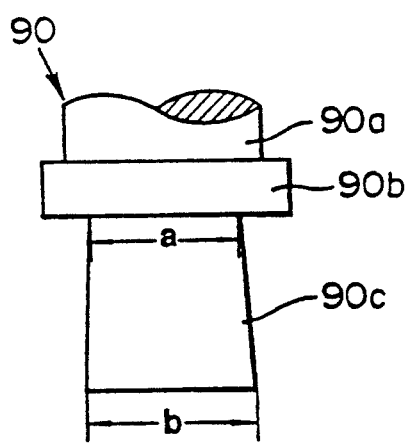
FIG. 2 is a partial front view illustrating a guide pin of the conventional magnetic tape cassette including a reverse tapered press-fit section.
Figure 3A:
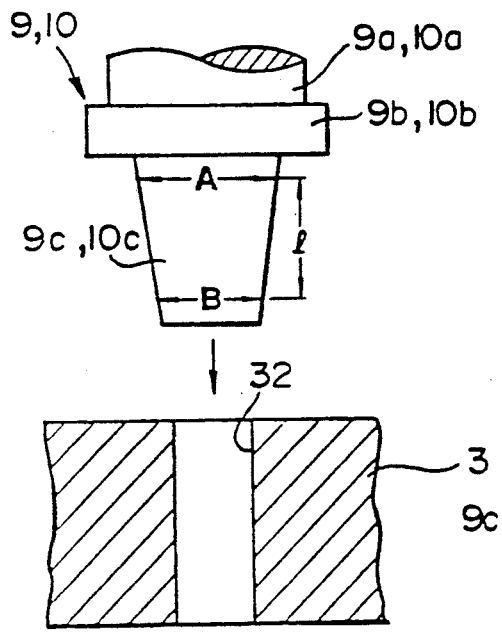
FIG. 3A is a sectional view illustrating a flanged tape guide pin of a tape cassette according to the invention at a state just before the flanged guide pin is press-fitted into the lower half of the cassette casing.
Figure 3B:
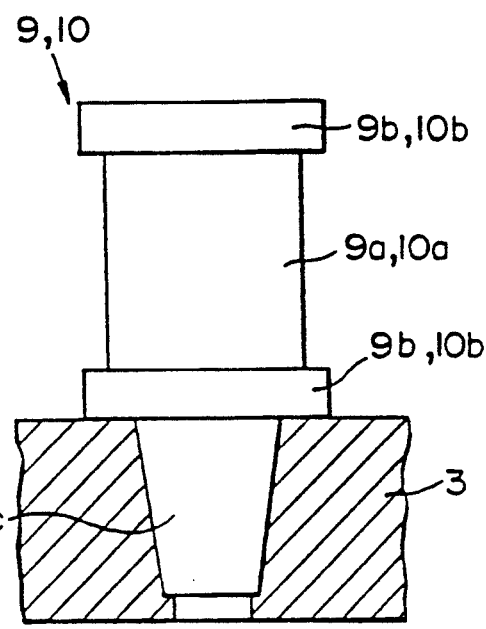
FIG. 3B is a sectional view illustrating the flanged guide pin as shown in FIG. 3A at a state wherein the guide pin is press-fitted into the lower half of the cassette casing.

As clearly seen in FIGS. 3A and 3B, the flanged guide pins 9, 10 are integrally formed with tape contact sections 9a, 10a, upper and lower flange sections 9b, 10b, and frusto-conical press-fit sections 9c, 10c, respectively. These guide pins 9 and 10 are formed of non-magnetic stainless steel material by lathe machining. As previously described, the tape contact sections 9a, 10a permit tape to be wound there on at the predetermined contact angle. The upper and lower flange sections 9b, 10b, restrict lateral movement of the tape 7. The press-fit sections 9c, 10c are formed in a taper fashion wherein the outer diameter is gradually decreased from the root, connected to the bottom surface of the lower flange section 9b, to the end. Assuming that dimensions A, B, and are taken as shown in FIG. 3A, it is desirable that the taper (A-B) of the press-fit section 9c, 10c be selected within a range between 1/250 to 1/38. If the taper dimensions exceed the above mentioned desirable taper, it is difficult to insure that high flatness of the lower half 3 is reliably maintained due to the high stress that would be generated in pressing the guide pins to the lower half 3. Conversely, if the taper dimensions are less than the desirable taper, there is a possibility that the press-fit section of the guide pin will become straight, or a reverse taper may be formed which would be unsuited to press-fitting, due to fluctuations in lathe machining accuracy.

Figure 4A:
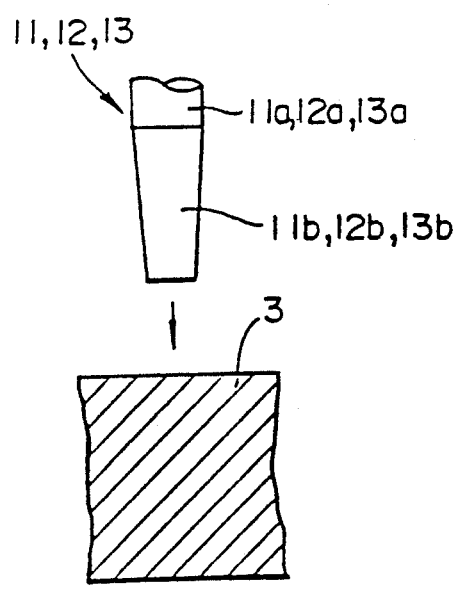
FIG. 4A is a sectional view illustrating a straight guide pin of a tape cassette according to the invention at a state just before the straight guide pin without a flange section is press-fitted into the lower half of the cassette casing.
Figure 4B:
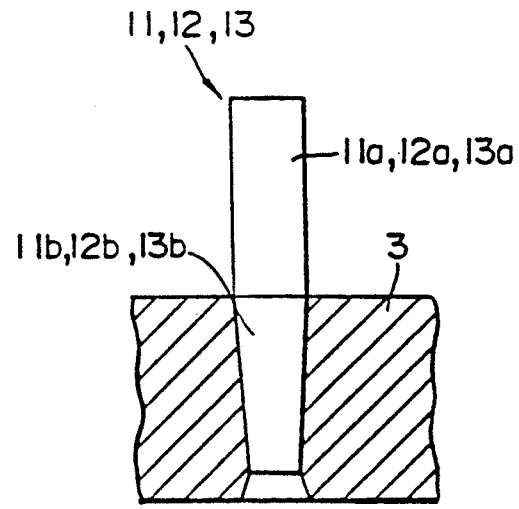
FIG. 4B is a sectional view illustrating the straight guide pin as shown in FIG. 4A at a state wherein the straight guide pin is press-fitted into the lower half of the cassette casing.

As clearly seen in FIGS. 4A and 4B, the straight guide pins 11, 12, and 13 are integrally formed with tape contact sections 11a, 12a, and 13a, and frusto-conical press-fit sections 11b, 11b, and 13b, respectively. The guide pins 11, 12, and 13 are formed of non-magnetic stainless steel material by lathe machining. The press-fit sections 11b, 12b, and 13b are formed within the same taper range as the press-fit sections 9c, 10c. As seen in FIG. 6, out of the three straight guide pins 11, 12, and 13, only guide pins 11 and 13 come into contact with the oxide (recording) surface of the tape, while the guide pin 12 comes into contact only with the uncoated surface of the tape. In this embodiment, the maximum surface-roughness Rmax 0.1 to 0.4 μm of the pins 11 and 13 is less than the maximum surface-roughness Rmax 0.5 to 0.8 μm of conventional guide pins, thereby reducing dust generated at the point of contact between the guide pins and the coated tape surface. In this manner, so-called dropout error, due to abrasion of the magnetic oxide at a certain point on the tape, is prevented. The magnetic tape cassette according to the embodiment has high durability and high reliability as a high quality recording medium. Desirably, the outer peripheral surfaces of the guide pins 11 and 13 are finished by superfinishing after centerless grinding, so as to accomplish a maximum surface-roughness of Rmax 0.1 to 0.4 μm with regard thereto. If the surface-roughness Rmax is less than 0.1 μm, there is a tendency for the tape surface and the outer peripheral surfaces of the guide pins 11 and 13 to adhere to each other. Therefore, as set forth, it is desirable that the surface-roughness Rmax of the outer peripheral surface of the two pins 11 and 13 be selected within a range of 0.1 to 0.4 μm. In constructions according to the embodiment, the flanged guide pins 9 and 10 are aligned with holes 32 formed is the lower half 3 as shown in FIG. 3A and thus the guide pins 9 and 10 are press-fitted onto the lower half 3 as shown in FIG. 3B. While as shown in FIG. 4A, the straight guide pins 11 to 13 are directly pressed into the lower half 3 without preformed holes and thus the guide pins 11 to 13 are press-fitted onto the lower half 3 as shown in FIG. 4B. As shown in FIG. 4A, note that the circular end surface of each press-fit section of the straight guide pins 11, 12, and 13 is flat and perpendicular to the axis of the guide pin so as to provide an optimal pressing. In the above mentioned pressing method, the necessity of having preformed holes with regard to the lower half is determined depending on the outer diameter of the press-fit section of the guide pin in conjunction with the mechanical strength of the lower half of the casing.

In the pressing process, since the press-fit sections 9a to 13a are formed in a taper fashion, pressing is accomplished in such a manner that the hole is gradually expanded over the entire surface of the press-fit section according to the press-fitting stroke, so that after the pressing is completed, pressure occurring between the press-fit section and the lower half exceeds a required pressure over the whole surface of the press-fit section. When these conditions are met, the guide pins 9 to 13 are firmly connected to the lower half 3, such that these guide pins cannot be easily removed. In such tapered guide pins, since the end of the press-fit section has the smallest diameter, the initial impact occurring at the beginning of the pressing stroke is suppressed to a minimum value, thereby providing smooth pressing. This prevents the lower half 3 from deforming due to excessive initial impact during pressing. As a result, high flatness of the lower half 3 may be maintained.

As shown in FIGS. 7A to 7D, the previously described straight guide pins 11 to 13, each including a tapered press-fit section and directly press-fitted into the lower half without preformed holes, may be replaced with a guide pin 28 including a chamfered press-fit section 29 which has a chamfered annular circumference 29c at the end. The guide pin 28 will be referred to as a "chamfered guide pin". The pressing process is started from the starting state of FIG. 7A, and continues via the intermediate pressing states of FIGS. 7B and 7C, to the pressing completed state of FIG. 7D, in that order. In FIGS. 7A to 7D, the press-fit section 29 corresponds to the section lower than the phantom line. As clearly seen in FIG. 7A, the chamfered press-fit section 29 includes a cylindrical outer peripheral surface 29b of an outer diameter $D_2$ and a circular, flat end surface 29a of an outer diameter $D_1$ less than the diameter $D_2$. The press-fit section 29 also includes the chamfered annular circumference 29c joining the flat end surface 29a and the outer peripheral surface 29b. Preferably, the chamfered circumference 29c may be formed with a surface curved (in cross-section) within the range of a radius R of 0.2 to 0.3 mm or with a 45° sloped, frusto-conical surface essentially equivalent to the above mentioned curved surface.

The pressing process of FIGS. 7A to 7D is achieved according to the following steps.

First, as shown in FIG. 7A, the press-fit section 29 is pressed downwardly to the upper press-fit surface of the lower half 3 in a state therein the flat end surface 29a and the press-fitted surface are parallel with each other and the axis of the guide pin is arranged perpendicularly to the upper surface of the lower half 3.

As shown in FIG. 7B, the end surface 29a reaches and pressingly abuts the upper surface of the lower half 3. Thereafter, shearing fracture indicated by reference numeral s of FIG. 7B occurs at an essentialy cylindrical portion of the lower half 3 along the outermost circumference (diameter $D_1$), of the end surface 29a. According to subsequent pressing, the shearing fracture grows gradually towards the lower surface of the lower half 3. As seen in FIG. 7C, a hole 34 formed by the shearing fracture includes a substantially cylindrical sheared surface and a substantially frusto-conical broken-out surface extending or growing gradually from the sheared surface to the lower surface of the lower half 3. Assuming that the length of the press-fit section 29 is set to a length of 2T/3 with regard to a thickness T of the lower half 3, the sheared surface and the broken-out surface respectively correspond to a length 2T/3 and a length T/3, as shown in FIG. 7C. In other words, the shearing fructure reaches the 2T/3 length of the lower half 3 and thereafter the lower section of the lower half corresponding to the T/3 length is broken out. In this manner, while a portion of the lower half is punched out as a punched portion 35, the press-fit section 29 is gradually press-fitted into the hole 34 in such a manner as to expand the inner diameter of the hole 34 by means of the chamfered lower circumference 29c. Thus, the pressing is completed as seen in FIG. 7D. If the guide pin 28 is forcibly removed from the lower half 3 after completion of the pressing as shown in FIG. 7D, the inner diameter of the hole 34 may become substantially equal to the outer diameter $D_1$ of the outermost circumference of the end surface 29a as shown in FIG. 8. That is, after completion of pressing, the hole 34 is expanded by the difference between the inner diameter of the hole 34 (substantially equal to the diameter $D_1$) and the outer diameter $D_2$ of the cylindrical outer periphery of the press-fit section 29. In other words, according to the above pressing method, pressure generated due to elastic deformation of the inner periphery of the hole 34 corresponding to the above mentioned difference is applied to the outer peripheral surface 29b of the press-fit section 29.

In conventional straight guide pins, the curved surface of the chamfered circumference of the press-fit section is formed at a relatively small radius, such as 0.1 mm, according to research by the inventors of this invention. When comparing the radii R of 0.1 mm and 0.2 to 0.3 mm, the force F required to remove the guide pin 28 from a lower half 3 having a thickness T of 2 mm is indicated, according to the outer diameter $D_2$ of the press-fit section 29 of the guide pin 28, in the Table 1. This data was experimentally confirmed by the inventors.

TABLE 1

| Thickness T (mm) | Diameter $D_2$ (mm) | Radius R (mm) | Force F (kg) |
|---|---|---|---|
| 2 | 2.3 | 0.2–0.3 | 80 |
|   |     | 0.1     | 70 |
| 2 | 3.4 | 0.2–0.3 | 90 |
|   |     | 0.1     | 70 |
| 2 | 3.9 | 0.2–0.3 | 130 |
|   |     | 0.1     | 90 |

As will be appreciated from Table 1, a chamfered guide pin 28 having a curved surface along a radius R of 0.2 to 0.3 mm according to the invention is inferior to conventional guide pins having a curved surface along a radius R of 0.1 mm, with regard to the removing force F. If the radius R exceeds 0.3 mm, the hole 34 is excessively, elastically deformed and, as a result, high flatness of the lower half 3 may not be maintained.

Although the previously described pins, including tapered or chamfered press-fit sections, serve as tape guide pins or tape guide roller shafts, these pins may also serve as a pivot shaft, a supporting shaft or the like.

The tape cassette casing 1 also includes a tape exposure section 20 through which some of the tape 7 is exposed to the outside of the casing 1. The tape exposure section 20 is provided within the straight tape travel path between the flanged guide pins 9 and 10, such that the coated tape surface and a recording and/or reproducing head may come into contact with each other during recording and/or reproducing. The cut-out portion 21 of the tape exposure section 20 is hermetically covered by a pivotable cover 23 to prevent dust from entering the casing 1. The cover 23 is pivotably supported by an upstanding pin 30 provided on the lower half 3. The cover 23 is normally biased in a closed position by means of a coil spring 31. During recording and/or reproducing, the cover 23 is opened by a releasing device (not shown) provided in the recording and/or reproducing apparatus (not shown).

A tape travelling mechanism 14 includes a driven roller 15, disposed substantially midway between the two flanged guide pins 9 and 10, and two idle rollers 16 and 17, disposed in the vicinity of both corners of the rear surface of the casing 1. These rollers 15, 16, and 17 are rotatably supported by means of upstanding roller shafts 18 provided on the lower half 3. The driven roller 15 is comprised of a drive belt contact section, on which a flexible drive belt 25 is wound, and a drive roller abutting section 15a, which has an outer diameter greater than the drive belt contact section and is driven by a drive roller (not shown) of a tape drive device (not shown) provided in the recording and/or reproducing apparatus, during recording and/or reproducing. For this reason, a portion of the drive roller abutting section 15a is exposed through an opening 19 formed substantially in the center of the front face of the casing 1. As best seen in FIG. 6, the flexible drive belt 25 is endless and is wound in a manner so as to engage the above mentioned rollers 15, 16, and 17. Since the endless belt 25 is flexible, a portion of the drive belt between the driven roller 15 and the idle roller 17 pressingly contacts a portion of the outermost peripheral surface of magnetic tape 7 wound on the supply reel 5, while a portion of the drive belt between the driven roller 15 and the idle roller 16, pressingly contacts a portion of the outermost peripheral surface of magnetic tape 7 wound on the take-up reel 6 to turn the reels 5 and 6 when the belt 25 is driven via the driven roller 15.

Figure 9:
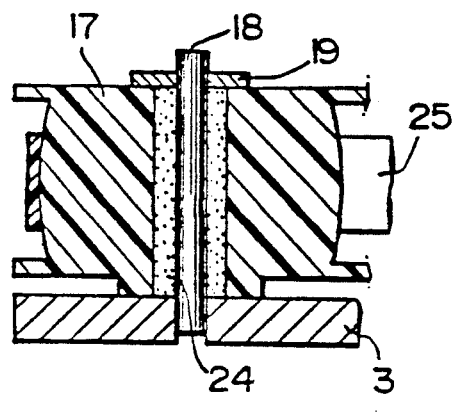
FIG. 9 is a cross sectional view taken along line IX—IX of FIG. 6.

As shown in FIG. 9, contacting surfaces between the respective associated rollers 15, 16, and 17 and shafts 18 are greased to prevent abrasion. According to the invention, grease 24 includes a viscosity coefficient of 50 to 500 poise within a range of grease temperature from −10° to 60° C. In this embodiment, a maximum surface roughness Rmax of the inner peripheral surface of the roller is designed to a value less than 0.1 μm and a maximum surface roughness Rmax of the outer peripheral surface of the shaft 18 is designed within a range of 0.2 to 0.6 μm. In FIG. 8, reference numeral 22 denotes a snap ring provided to restrict movement of the roller 16 in the axial direction of the shaft 18.

The magnetic tape cassette according to the invention operates as follows.

When the tape cassette is inserted into a loading holder (not shown) provided in the recording and/or reproducing apparatus and tape loading is started, the cover 23 is rotated to an open position against the spring force generated by the spring 31. Upon sufficient opening of the cover 23, the recording and/or reproducing head (not shown) of the recording and/or reproducing apparatus is pressed against the magnetic tape exposed through the tape exposure section 20 and simultaneously the drive roller (not shown) of the tape drive device (not shown) is pressed on the abutting section 15a of the driven roller 15. According to rotation of the drive roller of the tape drive device, the driven roller 15 is rotated and as a result the idle rollers 16 and 17 are driven by means of the drive belt 25. As shown in FIG. 6, assuming the drive belt 25 is driven in one direction indicated by the three arrows g, the magnetic tape 7 will be driven in the opposite direction indicated by two arrows h by frictional force created at the contacting portions between the magnetic tape 7 and the endless drive belt 25. In this manner, tape recording and or reproducing may be executed.

Figure 10:
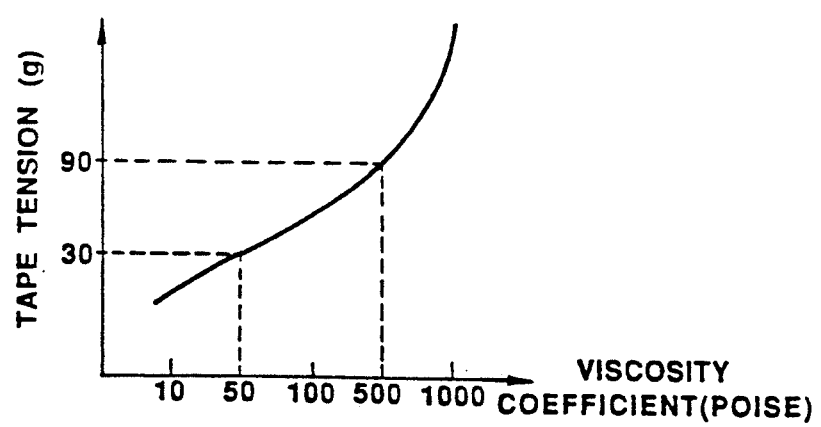
FIG. 10 is a graph illustrating the tape tension relationship relative to the viscosity coefficient of grease disposed between the associated tape guide roller and the shaft.

When the drive belt 25 is driven according to rotation of the drive roller of the tape drive device, each idle roller (16,17) is rotated against the viscous drag of grease 24 disposed between the inner peripheral surface of the roller and the outer peripheral surface of the shaft. As best seen in FIG. 6, assuming the drive belt 25 is driven in the direction indicated by the arrows g, the tension of the drive belt between the driven roller 15 and the idle roller 16 is slightly decreased by viscous drag of grease disposed between the idle roller 16 and the shaft 18 and while the tension of the drive belt between the driven roller 15 and the idle roller 17 is slightly increased by viscous drag of grease disposed between the idle roller 17 and the shaft 18. Conversely, when the drive belt 25 is driven in the opposite direction, the belt tension between the driven roller 15 and the idle roller 16 is slightly increased and the belt tension between the driven roller 15 and the idle roller 17 is slightly decreased, for the same reasons described above. In this manner, the viscous drag of the grease results in belt tension adjustment between a belt section tightened between the two rollers (15, 16) via the outer periphery of the magnetic tape wound on the reel 6, and a belt section tightened between the two rollers (15, 17) via the outer periphery of the magnetic tape wound on the reel 5. As set forth above, since the magnetic tape 7 is driven by frictional force created at the contacting portions between the magnetic tape 7 and the drive belt 25, assuming that the drive belt 25 is driven in one direction indicated by the arrows g, the slightly increased belt tension is applied to the outer periphery of the magnetic tape wound on the reel 5 serving as a take-up reel and the slightly decreased belt tension is applied to the outer periphery of the magnetic tape wound on the reel 6 serving as a supply reel. In other words, the tape tension difference between the take-up end supply reels is proportional to the belt tension difference. In this way, the tape tension is optimally adjusted by the viscous drag of grease 24 having a predetermined viscosity coefficient, such that the tension of the take-up reel side becomes slightly higher than the supply reel side. As shown in FIG. 10, it has been experimentally proven by the inventors that the tape tension is stable within an optimal tape tension range of 30 to 90 g when the viscosity coefficient of grease 24 is within a range of 50 to 500 P (poise).

Figure 11:
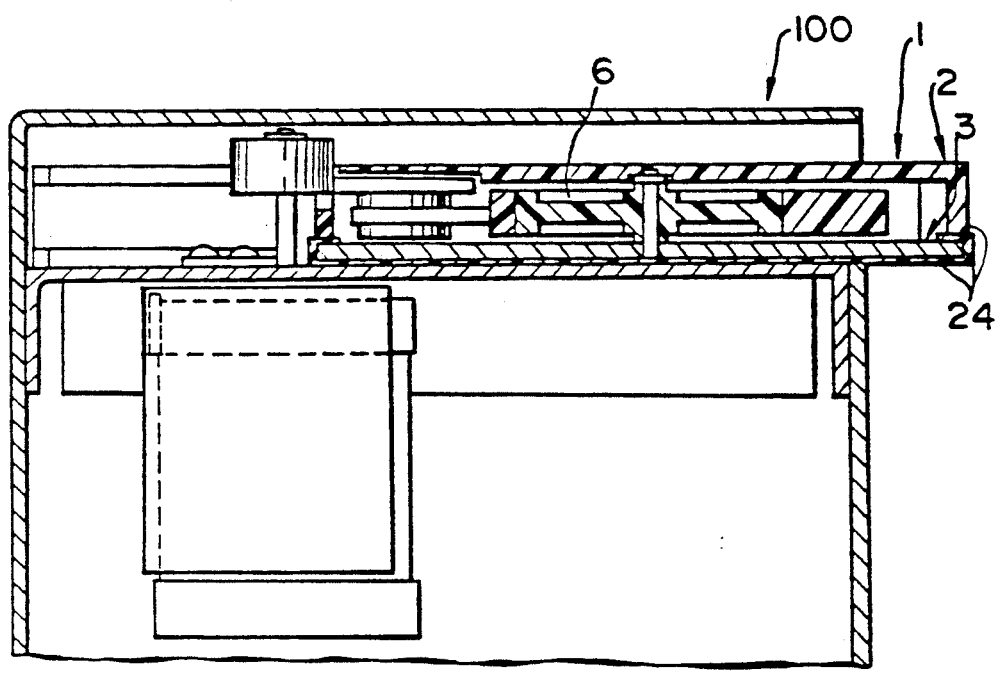
FIG. 11 is a partial sectional view illustrating the tape cassette according to the invention in a state wherein the cassette is inserted at a predetermined loaded position in a recording and/or reproducing apparatus.
Figure 12:
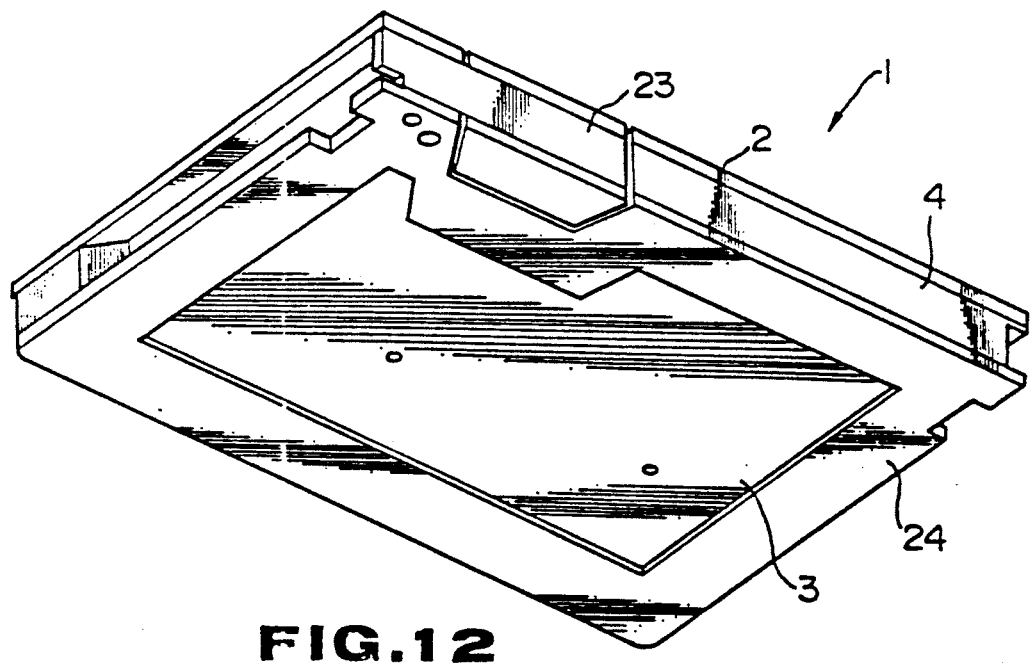
FIG. 12 is a perspective view illustrating the bottom surface of the lower half of the casing showing the attachment of an electrically insulating frame.

In magnetic tape cassettes employing tape guide pins press-fitted into the lower half of the casing, since the lower half 3 of the cassette casing 1 is conventionally made of an electrically conductive material, such as aluminium alloy, if the tape cassette is set in the cassette holder of the recording and/or reproducing apparatus 100 as shown in FIG. 11, such that a portion of the cassette casing 1 is exposed outside of the apparatus 100, there is the possibility that a user may touch the exposed portion of the tape cassette. As previously described, during operation of the apparatus 100 there is a tendency for static electricity from the user to be discharged through the exposed portion of the electrically conductive lower half into the electrical control unit of the apparatus. To prevent this, an electrically insulating cover or frame 24 is attached to the lower half 3 in such a manner as to border the outer perimeter of the bottom surface of the lower half 3 at a width of substantially 20 mm, as clearly seen in FIG. 12. With these constructions, the magnetic tape cassette according to the invention, has high durability and high reliability to maintain high quality as a recording medium.

Figure 13:
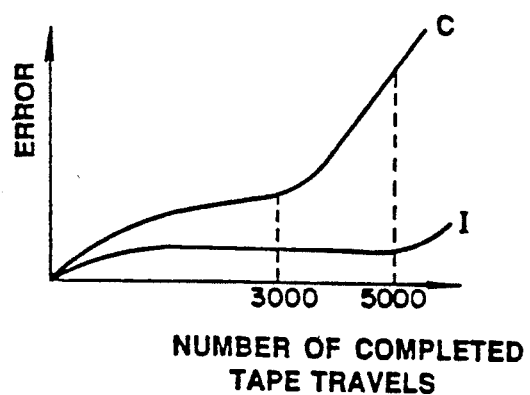
FIG. 13 is a graph illustrating the degree of tracking error with regard to the number of completed (full-length) tape travels when comparing the conventional tape cassette C and the improved tape cassette I according to the invention.

As shown in FIG. 13, when comparing a conventional magnetic tape cassette C and a magnetic tape cassette I of the present embodiment, the tape cassette I ameliorates the degree of tracking error or reading error relative to the number of completed tape travels.

As will be appreciated from the above, although in the present embodiments according to the invention, a tape cassette including magnetic tape is used as a recording medium, another type tape cassette may be used as such a recording medium.

While the foregoing is a description of the preferred embodiments for carrying out the invention, it will be understood that the invention is not limited to the particular embodiments shown and described herein, but may include variations and modifications without departing from the scope or sprit of this invention as described by the following claims.

What is claimed is:

1. A tape cassette comprising:
a pair of reels mounted side by side, on which tape is wound;
a cassette casing for rotatably enclosing said pair of reels therein;
a driven roller being rotated by a drive device of a recording and/or reproducing apparatus, associated with said tape cassette, said driven roller rotatably supported by an upstanding roller shaft fixed on the wall of said casing;
a pair of idle rollers, each rotatably supported by an upstanding roller shaft fixed on the wall of said casing;
a endless flexible drive belt for drivingly engaging said driven roller and said idle rollers to rotate said reels, such that a portion of said drive belt between said driven roller and each idle roller pressingly contacts a portion of the outermost peripheral surface of the tape wound on each reel, said drive belt being driven according to rotation of said driven roller;
means for controlling tape tension of the tape during operation of said tape cassette, said means including grease disposed between said associated rollers and shafts for lubricating the contacting surfaces therebetween, with a predetermined viscous drag;
said grease including a viscosity coefficient of 50 to 500 P (poise) within a grease temperature range of −10° to 60° C.

2. The tape cassette as set forth in claim 1, wherein each of said roller shafts is press-fitted through the wall of said casing, said roller shaft including a press-fit section press-fitted into said casing, said press-fit section being formed in a taper fashion in such a manner as to gradually decrease its outer diameter towards the end of said press-fit section.

3. The tape cassette as set forth in claim 2, wherein said press-fit section is frusto-conical, and its taper is within a range of 1/250 to 1/38.

4. The tape cassette as set forth in claim 1, wherein each of said roller shafts is press-fitted through the wall of said casing, said roller shaft including a cylindrical press-fit section press-fitted into said casing without a preformed hole, the press-fit section including a cylindrical outer peripheral surface coaxial to the axis of the pin, a chamfered annular circumference at the lower tip of the cylindrical surface, terminating in a flat circular end perpendicular to the axis and having an outer diameter less than that of the cylindrical surface, said chamfered annular circumference including a predetermined range of geometry and dimension.

5. The tape cassette as set forth in claim 4, wherein said predetermined range of geometry and dimension of said chamfered circumference is a curved surface, the curve, in cross-section, corresponding to the perimeter of a circle with a radius in a range of 0.2 to 0.3 mm, or with a 45° sloped, frusto-conical surface essentially corresponding to the dimension of the curved surface.

6. The tape cassette as set forth in claim 1, wherein said casing is comprised of an upper half formed of electrical insulating material and a lower half formed of electrically conductive metal material suitable for the press-fitting of said upstanding pin, when a portion of the conductive lower half being exposed outside of a recording and/or reproducing apparatus in a state wherein said tape cassette is set to a predetermined loaded position, said casing including an insulating member for electrically insulating the conductive half, for preventing static electricity from being introduced through an exposed portion of the conductive half into the apparatus, said insulating member comprising the outer wall of said casing surrounding the outer perimeter of the conductive half, said insulating member overlapping the exposed underside of the conductive half by substantially 20 mm.

* * * * *